United States Patent [19]
Reem

[11] Patent Number: 5,164,653
[45] Date of Patent: Nov. 17, 1992

[54] BATTERY DISCHARGE CONTROL SYSTEM
[75] Inventor: James B. Reem, Millersville, Pa.
[73] Assignee: C & D Charter Power Systems, Inc., Leola, Pa.
[21] Appl. No.: 604,140
[22] Filed: Oct. 26, 1990
[51] Int. Cl.$^5$ .............................................. H02J 7/00
[52] U.S. Cl. ........................................ 320/13; 323/269; 323/297; 323/367
[58] Field of Search ................... 320/13; 323/269, 297, 323/367

[56] References Cited

U.S. PATENT DOCUMENTS

| | | | |
|---|---|---|---|
| 1,214,663 | 2/1917 | Evans | 323/297 |
| 3,281,832 | 10/1966 | Schwartz | 323/297 |
| 3,801,894 | 4/1974 | Spiegel | 323/269 |
| 3,979,657 | 9/1976 | Yorksie | 320/13 |
| 4,210,855 | 7/1980 | Harer et al. | 320/13 |
| 4,349,777 | 9/1982 | Mitamura | 323/297 |
| 4,380,726 | 4/1983 | Sado et al. | 320/13 |
| 4,414,501 | 11/1983 | Bedard et al. | 323/297 |
| 4,703,247 | 10/1987 | Morioka | 320/13 |
| 4,871,956 | 10/1989 | Barrella | 320/13 |
| 5,043,651 | 8/1991 | Tamura | 320/43 |

FOREIGN PATENT DOCUMENTS

| | | | |
|---|---|---|---|
| 1588150 | 5/1970 | Fed. Rep. of Germany | 320/13 |
| 0562887 | 3/1976 | U.S.S.R. | 320/13 |
| 0902116 | 2/1982 | U.S.S.R. | 320/13 |
| 0427430 | 4/1935 | United Kingdom | 323/297 |

Primary Examiner—Steven L. Stephan
Assistant Examiner—Thomas M. Dougherty

[57] ABSTRACT

Apparatus for controlling rate of battery current discharge, comprising, variable means applying resistance load to the battery output, comparator means connected for defining and communicating a targeted battery discharge current level set point, sensor means connected for sensing the rate of current discharge from the battery, and connected to the comparator for comparing the actual battery discharge current rate to the targeted battery discharge current, and adjusting means connected to the variable means and operative responsively to the comparitor means for incrementally increasing or decreasing the resistive load in response to signals from the comparator means as to whether the battery discharge current exceeds the targeted current set point.

5 Claims, 7 Drawing Sheets

BATTERY DISCHARGE CONTROL SYSTEM

FIELD OF THE INVENTION

This invention relates to a battery discharge control system, and further relates to a system for conditioning batteries, and to a method for performing these functions.

Electric storage batteries such as lead-acid batteries and others are conventionally "conditioned" or "formed" by repeatedly applying successive charge and discharge cycles. For example, in conditioning large batteries capable of providing heavy currents it is necessary to apply as many as five successive charge and discharge cycles in order to condition the battery. In doing this, the amount of each new charge introduced into the battery should not exceed, in ampere hours, the amount of the charge previously taken out. Thus it is important, whenever a charge has been introduced into the battery in a previous cycle, that a similar number of ampere hours should be removed from the battery in the course of the discharge cycle.

In certain applications for conditioning batteries it is necessary to discharge them at an accurately prescribed rate for a designated period of time. Due to the nature of such batteries customary circuits designed around transistors in standard regulator topologies prove to be both inefficient and unreliable. For example, standard current sense circuits used in conjunction with a pass transistor(s) are guaranteed to dissipate significant power in the pass device(s), since it must remain active. Switching power supplies must also dissipate power in the pass devices. In addition, these networks can suffer from such effects as second breakdown in high current applications causing a significant risk of failure.

Accordingly, it is desirable and important to carefully control the amount of ampere hours taken out in every discharge cycle. Moreover the discharge should be conducted at a constant current, as distinguished from a constant voltage, to control precisely the number of ampere hours discharged.

PRIOR ART

Battery discharge controllers known in the art have used linear or switch mode controls requiring many active elements such as transistors or other semi-conductor devices. These are highly prone to drift and/or burnout. Other prior art controllers have utilized static switching, and as a result are not accurate, not automatic, and sometimes neither accurate nor automatic.

OBJECTS OF THE INVENTION

It is accordingly an object of this invention to provide a method and apparatus for controlling the number of ampere hours removed from a battery, and for controlling the current flow from the battery, with precision and accuracy. It is further a object of this invention to provide such a controller which is essentially immune from the previous problems of drift and burnout.

Still a further object of this invention is to provide a battery discharge controller which insures the formation of maximum active material within the battery during a conditioning or forming series of cycles. Still another object of this invention is to provide a battery discharge controller capable of using commercially available sub-assemblies, which has a construction that is highly modular and utilizes straightforward design principles, thus simplifying repair and updating of designs.

Still another object of this invention is to provide a battery discharge controller having a basic functionality which allows the same basic unit to be used for wide varieties of requirements utilizing widely varying battery structures and strings of batteries requiring various rates of testing.

Still another object of this invention is to provide a battery controller circuit which is entirely air cooled and uses only resistive dissipation, thus eliminating blown transistors which has been one of the major problems of past designs.

Still another object of this invention is to provide a battery controller system and method of eliminating problems of drift.

Still another object of this invention is to provide a battery discharge controlling system which can be retro-fitted to utilize the heater portion of existing systems Still another object of this invention is to provide a battery discharge control unit which is reliable and extremely stable, holding very heavy current discharges up to 400 amperes or more within less than one tenth of one percent of error without operator adjustment.

Other objects and advantages of this invention, including its simplicity, reliability, maintainability and flexibility, will further appear hereinafter and in the drawings, of which:

DRAWINGS

DETAILED DESCRIPTION

The present invention ameliorates the problems found in a controllers based on prior art by using a static array of switches, and low resistance elements in place of the usual pass devices. Control of this array is accomplished through the use of predominantly digital circuitry and a set of solid state relays. As a result, while significant power is dissipated in the resistor array, virtually no power is dissipated in the switching and sensing network, replacing the usual pass device(s), which comprises a very small valued sense resistor and virtually ideal switches.

Figure 1:
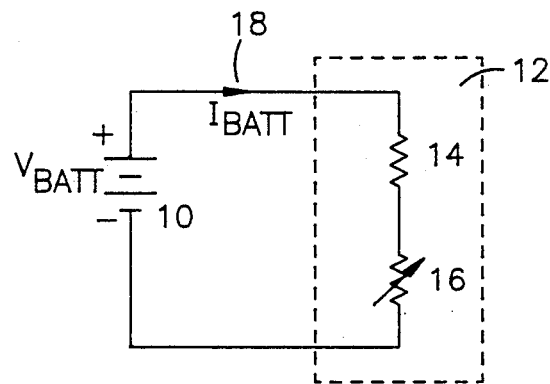
FIGS. 1-3 are schematic circuit diagrams of battery discharge control systems embodying features of this invention.

Turning now to the specific forms of the invention selected for illustration in FIG. 1 of the drawings, the battery 10 is connected in series with means 12 for controlling current flow 18 which acts substantially as a load resistor across the battery. Ohm's Law states that the current through the load is inversely proportional to the resistance of the load, or more conveniently, the current 18 through the load 12 is proportional to the conductance of the load. In this application the load 12 is composed of the series combination of a sense resistor 14 and a variable (to be described shortly) main load resistance 16. By choosing the sense resistance to be very small compared to the main load, the current can be accurately described as being determined solely by the size of the main load. Specifically, we have Ibatt = G Vbatt where Ibatt is the current 18 in the battery and the load, Vbatt is the terminal voltage of the battery, and G is the conductance of the load which will be assumed equal to the conductance of the main load 16 neglecting the sense resistor's presence.

Figure 2:
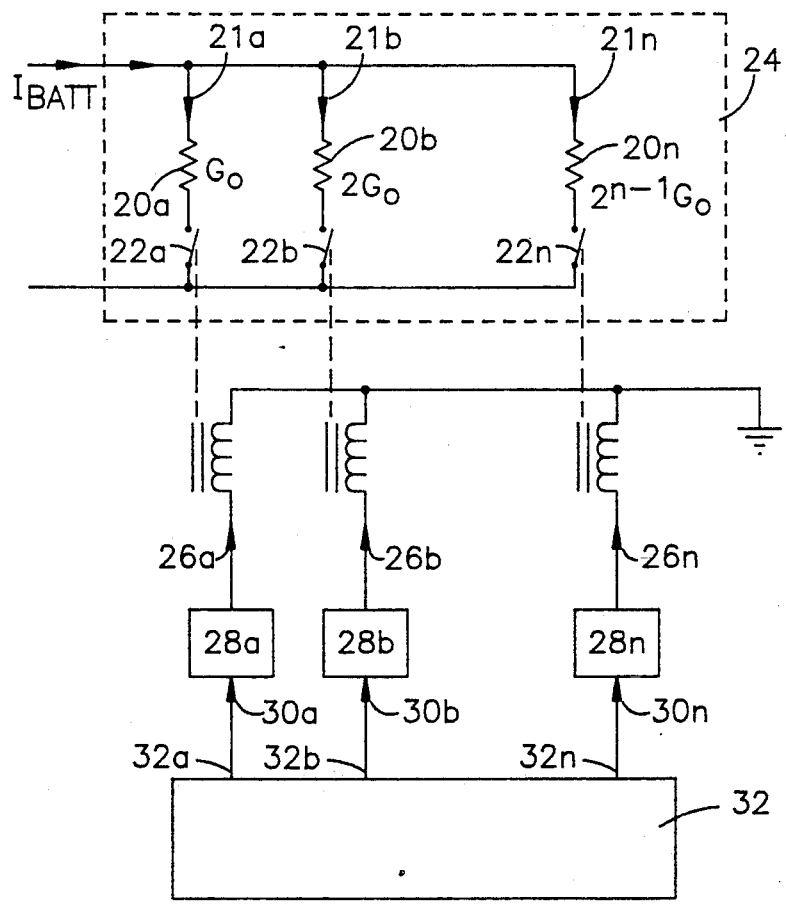

A basic fact in electric circuits is that if a number of resistors are connected in parallel their conductances add. Hence, if the main load were comprised of an array of parallel resistors as shown in FIG. 2, each having conductance G1, G2..., Gn, then the above equation would appear as, Ibatt =(G1+G2...Gn) Vbatt. It is clear that if G1 through Gn were scaled in a binary sequence, namely, $Gi=Go\ 2^i$ and could be individually added or deleted from the parallel connection that any value of conductance between 0 and $2^n-1$) Go could be synthesized. Hence, through the above equation, any value of current from 0 to $(2^n-1)$ Go Vbatt amps, in steps of Go Vbatt amps, may be selected.

FIG. 2 specifically shows the way a variable resistance 16 of FIG. 1 may be made. n resistors, 20a,b..., each scaled by a factor of two from one another and each in series with a mercury switch, 22a,b,..., are connected in parallel. The resistance of mercury switches is so low that it may be neglected, so it may be assumed that any given resistor 20i is in series with an ideal switch 22i. Accordingly, as the respective switches are opened or closed the conductance of the respective resistors is deleted or added to the net conductance. In this way, a specified amount of current 21i corresponding to a specific conductance 20i is deleted or added to the total current, Ibatt, in accordance with the above equation. As stated above this current can be adjusted in steps of Go Vbatt, where Go is the smallest of the conductances.

The variable resistance 24 in FIG. 2 is electronically controlled by making the mercury switches responsive to respective control currents 26,a,b... in the usual way that relays operate. Since these switches are used in fairly high current applications a significant control current is usually required to energize the relays of which they are a part, causing them to close. This current can be switched itself through a lower current solid state relay 28,a,b..., which may; be energized by the small currents 30,a,b... typically available from the outputs of integrated circuits. In this way the main load may be controlled from standard integrated logic circuits, designated 32, as shown in FIG. 2. Each output 32a,b... drives one of the solid state relays which in turn energizes the respective mercury switch relay, which finally adds the prescribed conductance 20 a, b,... to the main load 24, and thereby the prescribed increment of current 21 a, b,... to the total current, Ibatt.

It can now be seen that the load conductance can be incremented through its complete series of values monotonically by starting with all switches off and switching them back on in accordance with a straight binary counting scheme. If we assign one bit of a binary number to each leg of the main load such that the least significant bit is paired with the smallest conductance, and so on, in such a way that a "0" means the switch is open, and a "1" means the switch is closed, then there will be a one to one correspondence between the size of the binary number and the amount of conductance in the main load. Specifically, if the IC(s) 32 controlling the conductance in FIG. 2 were a binary counter wired in such a way that a logic "1" at an output 32i energized its respective mercury switch 22i through the intermediate solid state relay 28i, and the output bits were assigned in ascending order to the values of conductance in ascending order, then as the counter counted from "00...0" to "11...1" the main load conductance would monotonically increment from 0 to $(2^n-1)$ Go in steps of Go, causing the total current in the circuit to monotonically increment from 0 amps to $(2^n-1)$ GoVbatt amps in steps of Go Vbatt amps.

Now the relationship between FIGS. 1 and 2 will be apparent. If one desired a specific amount of current to flow in the battery circuit of FIG. 1, using the circuit of FIG. 2 one could allow the counter to start from "00...0" and count up until the the counter prescribed current were observed, and then stop. This would freeze the current value at the desired value until the counter were again changed. Of course, the actual current could only approximate an arbitrary prescribed current, but the approximation would be to within the step size, GoVbatt. Given a maximum desirable current that could ever be selected the step size could be made arbitrarily small by increasing the number of bits, or specifically, the number of conductances. Hence, the accuracy of the approximation can be made as good as desired. 12 bits (respectively, 12 conductances) is found to be quite acceptable in practice.

Figure 3:
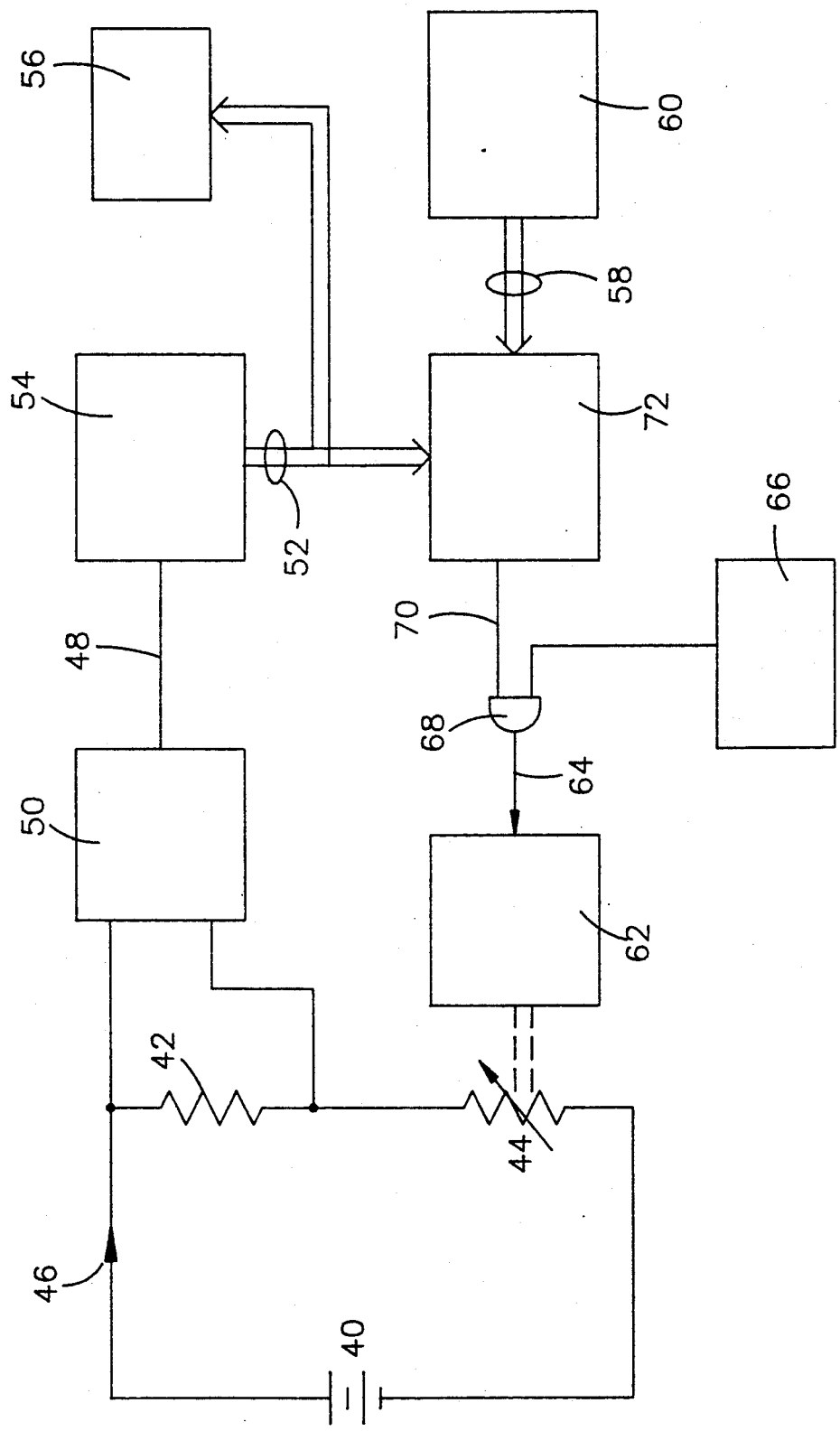

It is accordingly necessary to determine means for sensing the prescribed current and stopping the counter. Referring to FIG. 3, the small sense resistor 42, in series with battery 40 and variable load 44, is used to detect the current 46 flowing in the circuit. The current 46 is converted to a small voltage by resistor 42 which may be amplified as necessary by a sense amp 50, producing voltage 48 which is converted for this application to a binary number 52 by using a standard A/D converter 54. By matching the full range of sensed voltages (48) to the conversion range of the A/D converter 54, which may be easily done by adjusting the gain of the sense amp 50, the observed currents will cause the digital code 52 at the output of the A/D converter 54 to span the numbers, from "00..00" to "11...1" as the observed current 46 goes from 0 amps to the maximum to be detected. Since this circuitry can be accurately calibrated, the digital code 5-2 at the output of the A/D converter corresponds in a accurate way to absolute current 46 in the battery circuit. The discrete nature of the binary output code, however, suggests that absolute current can only be known to within an error determined by the number bits used by the A/D converter. However, high precision is easily obtained with, for example, 12 bits of resolution. Display circuitry 56 can be added to the output of the A/D converter 54 to allow monitoring of the battery current 46 by the user. Since the converter's output code corresponds to absolute current, a target value for absolute current can be stored in the form of another binary number 58, stored by a user in a digital latch or with switches designated 60. The stored, or preset, value 58 can be compared to the observed binary value 52 to determine if the desired current 46 is flowing in the battery circuit.

The operation of the overall device is as follows: The counter 62 controlling the main load 44 is reset to "00...0" or some desired starting count causing the current 46 in the battery circuit to be 0 or some desired starting valve. Then the counter is clocked by signal 64 causing the counter to count up in binary, thereby causing the battery current to increment as described earlier. The sense circuitry outputs a binary code 52 corresponding to the actual current flowing, and this code is compared to a preset value 58 which corresponds to the desired current. Since the battery current starts at 0 amps discharge or some starting valve below the desired discharge current and increments monotonically, it will eventually reach the preset value to within the incremental approximation, meaning that when the observed code 52 equals the preset value 58 the digital counter 62 can be stopped, freezing the current 46 at very nearly the desired value. The counter can be easily stopped by interrupting the clock signal 64 from clock generator 66, with a logic gate 68 for example using signal 70 taken from a digital magnitude comparator 72 which electronically compares the two digital numbers 52 and 58.

It should be noted that during operation the battery 40 discharges causing its terminal voltage to drop. This in turn will cause the current 46 to drop. Since the sense circuitry is always enabled the code 52 at the output of the A/D converter will drop as soon as the current falls by an amount equal to the smallest change detectable, determined by the number of bits employed. When this happens this code will no longer match the preset value and the counter will again be clocked, causing the load current to increase. When the increase is sufficient the sense current will again match the target current and the counter will freeze in this way described above, again holding the current constant. In this way the present invention not only establishes the desired current in the load but it also maintains the current at this level even as the battery becomes discharged. Since the maximum current available when the counter is at "11...1" may not be large enough when the battery voltage falls too low, means for preventing the counter from continuously cycling may be added.

It will be appreciated that the digital panel meter circuit need not be limited to twelve bits, but that twelve is a convenient and preferred number. Just a few bits might be enough in some cases, but twelve bits, which provides 4096 numerical slots, have been found to provide excellent accuracy without sacrifice of speed and convenience of operation.

It will be appreciated that in accordance with this invention it is possible to use a very simple comparator, or even to use only one bit of information indicating that the presently flowing current is equal to or not equal to the desired preset current, in which case the binary counter 62 will count one more step and cause one further step of reduction of the resistance 44.

The invention illustrated in FIG. 3 of the drawings is very advantageous since the solid state relays utilized require only a very small current, but have the capability of controlling switches such as mercury switches which have very high current capability and which can readily carry the heavy current 46 discharged from the battery 40.

It will be appreciated that in accordance with one form of the invention the binary counter 62 can be connected to start at all zeros and gradually count up in binary, decreasing $R_d$ by one count at a time thereby increasing the current by one unit each time until the desired current has been reached. When the comparator indicates that the actual current and the target current are equal, a steady current is automatically maintained during the remainder of the discharge cycle. All of these adjustments, of course, happen extremely rapidly so that in practical effect the battery is almost instantaneously controlled to provide a constant discharge current.

The clock generator 66 is, of course, connected to the binary counter to increment the counter in a manner well known in the art. It utilizes conventional flip-flops or the like, having internal logic circuits well known to those skilled in the art, to produce a binary code that appears to be counting up in binary. Each count of one in an upward direction is yielding a given decrement in the amount of resistance and therefore a given increase in the amount of current.

In accordance with a preferred example of the invention, the magnitude comparator 72 simply freezes the counter 62 in a manner well known per se when the correct current has been established. In freezing the counter 62 it may, for example, change the state of a conventional enabling pin, after which the counter 62 is no longer responsive to the clock generator input.

It will be appreciated that the comparator 72 may be binary or decimal, but when using the decimal mode at least five decimal places of accuracy are preferred.

Figure 4:
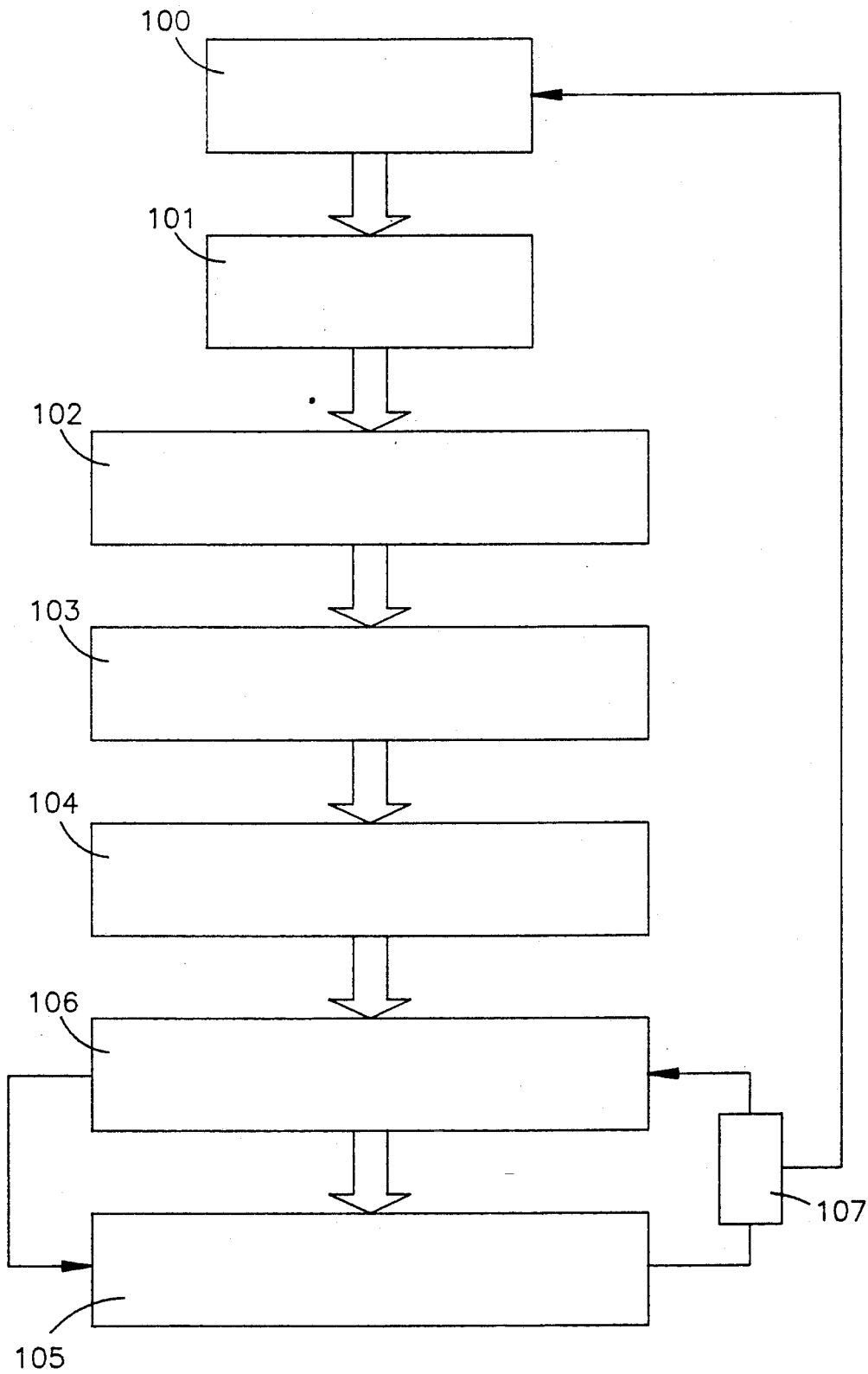
FIG. 4 is a block diagram illustrating one particular form of this invention.

FIG. 4 of the drawings shows one practical arrangement which has been found useful in the practice of this invention. The digital panel meter 100 is shown as interfacing with a digital comparator 101, which in turn interfaces with a twelve bit binary counter 102. This is connected to twelve stages of line drivers and solid state relays 103, which in turn are connected to actuate twelve stages of mercury contactors 104 which are capable of carrying the full current from the battery string 105. Twelve stages of resistive load 106 are connected to the battery string in series with a current shunt 107 connected back to the digital panel meter. Accordingly since the shunt 107 is in series with the battery string 105, all of the discharged current passes through the shunt 107.

Figure 5:
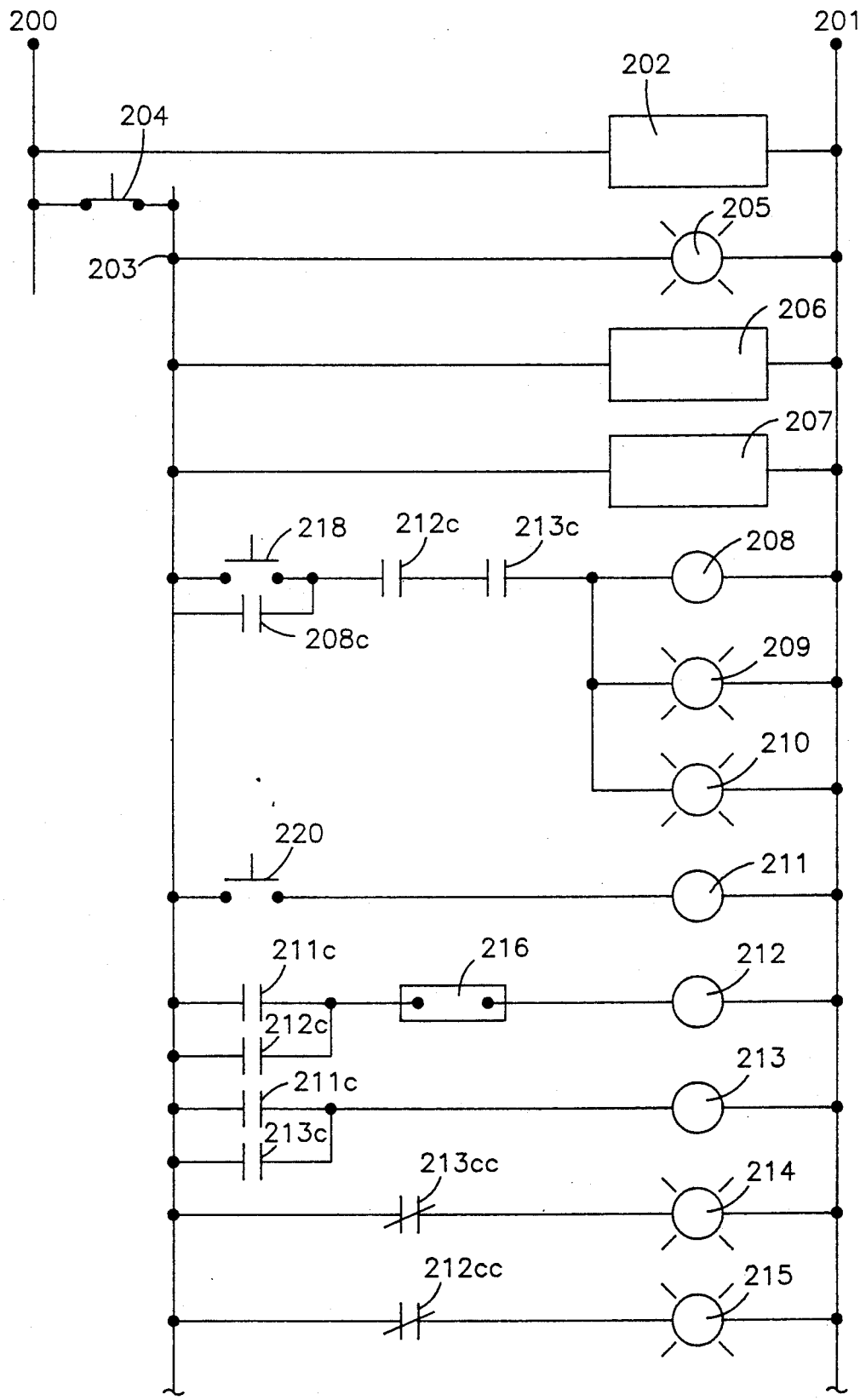
FIG. 5 is a face panel diagram indicating one way in which the panel board may be wired for convenience of operation.

Turning now to FIG. 5, this illustrates how the face panel for a typical embodiment of this invention can be wired. The AC mains are connected between terminals 200 and 201 which energizes the circuitry which is associated with the digital panel meter 202. Closing push button switch 204 applies AC power across the rest of the circuitry between nodes 203 and 201, energizing pilot lamp 205 in the process. Circuits 206 and 207 which produce the required +and −15 DC volts and 5 DC volts, respectively, are also energized in this process.

Normal starting operation commences with the closure of reset switch 220 which energizes relay coil 211. This causes the two sets of normally open switch contacts labelled 211c to close. Since solid state relay 216 is normally closed the closure of contacts 211c energizes relay coils 212 and 213. This in turn causes the several normally open switch contacts labelled 211c to close. Since solid state relay 216 is normally closed the closure of contacts 211c energizes relay coils 212 and 213. This in turn causes the several normally open contacts labelled 212c and 213c, respectively, to close, and the normally closed contacts 212cc and 213cc, respectively, to open. Note that when the contacts 212c and 213c in parallel with sets of contacts 211c close that contacts 211c may then open without interrupting power to relay coils 212 and 213. In this way only momentary closure of the reset switch 220 is necessary to energize relay coils 212 and 213. It should be noted that the opening of contacts 212cc and 213cc deenergizes pilot lamps 214 and 215, respectively. These lamps indicate that a power failure has occurred and that an undervoltage trip has occurred, respectively. The power failure pilot will again become energized if AC power is momentarily interrupted after the reset button has been released. This happens because a loss of AC power will momentarily deenergize relay coil 213 opening contacts 213c which will prevent reenergizing of the relay coil upon restoration of power. While this power interruption will also cause pilot light 215 to light in a similar way, another method of energizing pilot light 215 is provided by opening solid state relay 216 through the action of the undervoltage protection circuitry of FIG. 8, to be described shortly.

Now finally having energized relay coils 212 and 213 under normal circumstances contacts 212c and 213c will be closed. Closing "DC Power On" switch 218 will then energize relay coil 208 and pilot lights 209 and 210. Relay coil 208 controls normally open contacts 208c to close in parallel with switch 218, thus holding on this relay coil after switch 218 is released to its open position. At this time power is applied to the main battery discharge circuit described earlier through contacts not shown. Only an AC power interrupt or an undervoltage trip will cut the battery discharge off.

Figure 6:
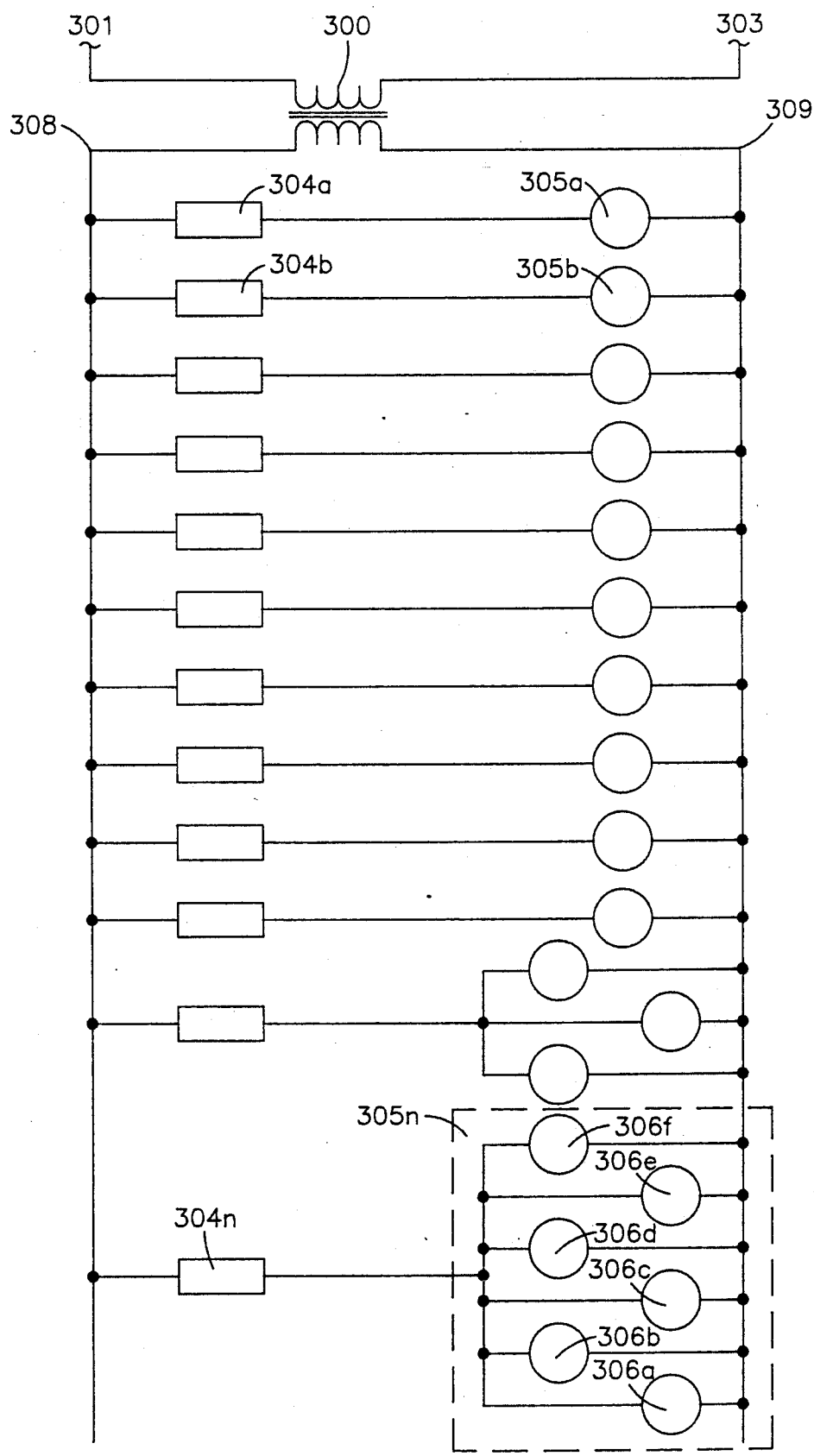
FIG. 6 is a similar diagram illustrating the arrangements of control elements in accordance with this invention.

FIG. 6 illustrates a typical arrangement of the relay control elements in an embodiment of this invention. Upon application of AC power from the mains across nodes 301 and 303, the primary of transformer 300 is energized which produces a stepped down AC voltage signal across nodes 308 and 309 appropriate for energizing the relay coils associated with the mercury switches described earlier in the resistor array controlling battery discharge current. Solid state relays 304a, b,...,n are each in series with relay coils 305a,b,...,n, respectively. When any one of the solid state relays is activated by circuitry described later in FIG. 7, that respective component appears as a short circuit thereby energizing the associated relay coil which in turn closes a respective mercury switch adding a respective amount of conductance to the variable resistance described earlier. Because of the very high currents flowing in some branches of the variable resistance array it is advantageous to parallel a number of mercury switches and resistors to achieve the effect of a very small resistance precisely. FIG. 6 shows, for example, 6 relay coils 306a through 306f all energized from the same solid state relay 304n causing ultimately 6 mercury switches to be closed adding a parallel combination of 6 resistances designed to implement the composite resistance of the n-th leg of the variable resistance corresponding in this case to the lowest resistance carrying accordingly the largest current component from the battery. Legs carrying less current require less parallelling of components, with most legs requiring only a single mercury switch.

Figure 7:
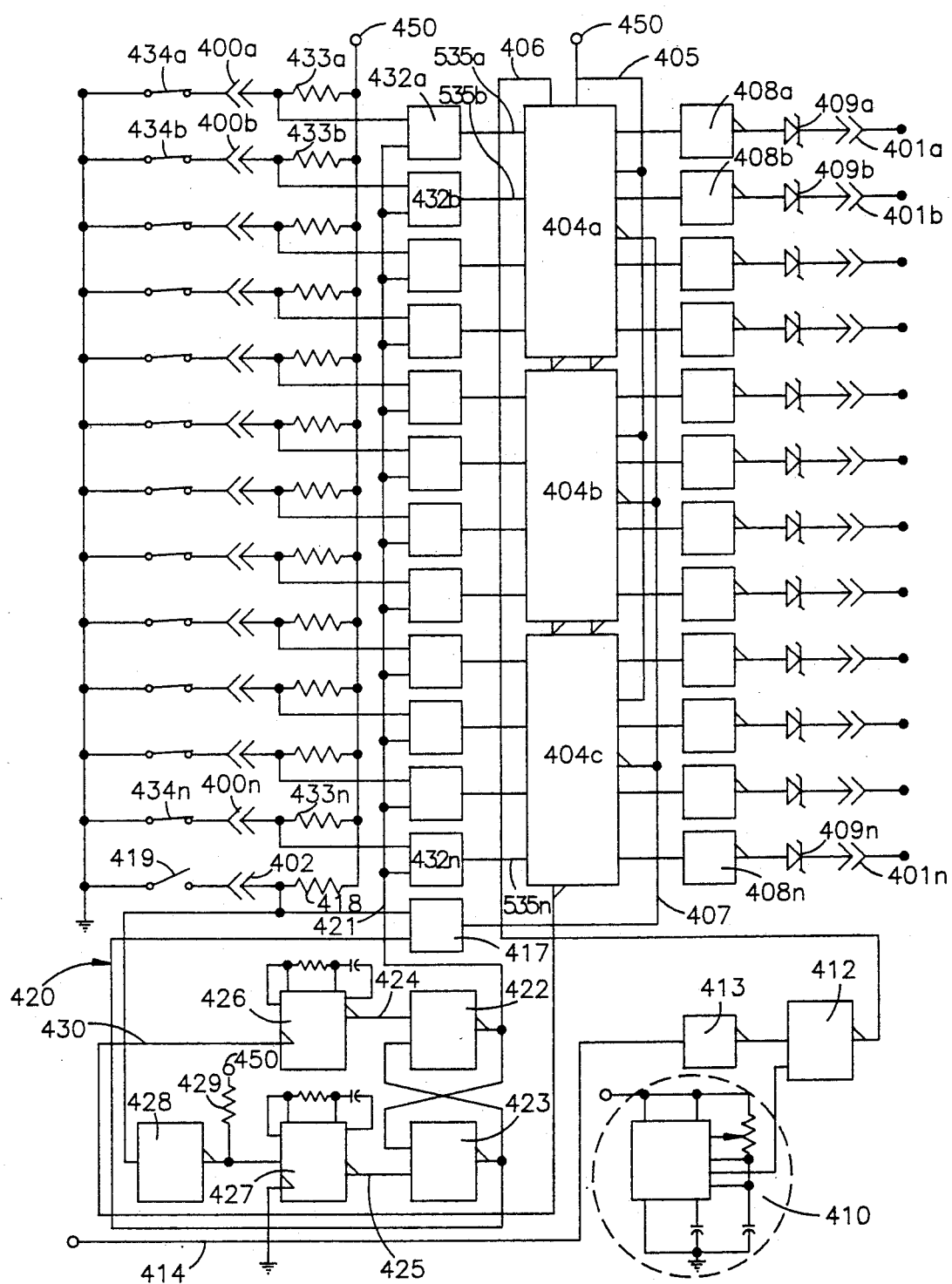
FIG. 7 is a more detailed electrical diagram indicating the construction, arrangement and operation of a particular form of the electronic control apparatus in accordance with this invention.

FIG. 7 illustrates a typical embodiment of the electronic control circuitry of this invention. This circuitry would typically be mounted on a single printed circuit board with edge connections 400a,b,...,n, 401a,b,...,n, and 402. The heart of this circuitry is comprised of a twelve bit counter implemented through the cascade connection of 4 bit counters 404a, 404b, and 404c. A typical IC for this application would a 74193 TTL presettable up/down counter. For this application the up count option is selected by tying the up count pin to a supply voltage at terminal 450. Clear pins are not used here so they may also be connected to a supply. This connection is indicated by wire 405 and its various connections. The counter is thereby programmed to count up in binary as clock pulses are applied via line 406. The initial value of the binary count may be preset by applying in this case a logic 0 to the line 407 which is ties to the preset inputs on the respective counter ICs. The outputs of the counter are each tied to the inputs of respective inverting line driving gates 408a,b,...,n which might be typically 1/6 of a 7406 TTL IC. In turn the outputs of these gates will pull low respective output lines 401a,b,...,n through zener diodes 409a,b,...,n, thus energizing respective solid state relays 304a,b,...,n shown typically on FIG. 6. The zener diodes are useful in preventing spurious signals causing erratic turn-on of the solid state relays.

It is now appreciated how the respective bits in the binary output of the counter selectively energize solid relays ultimately adding a prescribed conductance to the variable resistance in the battery discharge path.

Clocking for the counter is achieved via a clock signal from an oscillator 410 which may be implemented in the usual way with a 555 timer IC and associated circuitry. The output of the oscillator is gated via NAND gate 412 with a logic signal derived from invertor 413 receiving its input on line 414 from the logic comparator which compares the preset digital count to the A/D converter output described earlier. The sense of the logic signal from the comparator is such that it provides logic 1 on line 414 when the desired current flows in the battery circuit, thereby disabling the clock to the counter by providing a logic 0 to one of the inputs on NAND gate 412.

As mentioned above, the binary counter is preset whenever line 407 is taken low. Line 407 is driven by the output of AND gate 417 whose inputs are edge connection line 402 and line 420, respectively. A logic 0 on either of lines 402 or 420 will cause the output of gate 417 to go low presetting the counter. Since line 402 is pulled up by pull up resistor 418 connected to positive logic supply line 450, preset switch 419 must be closed in order to bring line 402 to a logic 0, thereby presetting the counter.

Alternatively, the counter may be preset by a low signal on line 420 driven by the RS flip flop circuitry comprising NAND gates 422 and 423. This condition occurs when NAND gate 423 produces a logic 0 at its output. However, in the usual way that RS flip flops work this can only occur is NAND gate 422 is driven to a logic 1 by a logic 0 pulse applied on line 424 by single-shot IC 426 and associated circuitry. Accordingly, single-shot 426 will produce this low pulse only if a logic 0 is applied to its inverting input as shown via line 430 which is tied to the carry out line on the binary counter. This carry out line becomes a logic 0 when a counter of 11...1 appears at the output of the 12 bit counter circuitry. It can now be seen that the counter will be preset in the event that the preset switch 419 is closed or the event that the counter counts up to its maximum count OF 11...1. Considering the rest of the flip flop circuitry, NAND gate 423 drives line 420 high whenever a logic 0 pulse appears on line 425 driven by single-shot IC 427 and associated circuitry. Respectively, the single-shot circuitry produces a low pulse whenever a logic 1 is applied via invertor 428 and associated pull up resister 429 tied to positive logic supply 450 to the noninverting input of single-shot IC 427. Accordingly, a logic 1 will be conveyed by invertor 428 whenever line 402 tied to its input is taken low.

Hence, the use of switch 419 to preset the counter will "reset" the flip flop circuitry, specifically resulting in a logic 1 on line 420 and a logic 0 on line 421 driven by the outputs of gates 423 and 422, respectively. The logic 0 on line 421 is applied simultaneously to each of the two input OR gates 432a,b,...n. This results in the outputs of each of these gates following the logical inputs applied via lines 400a,b,...n, respectively. These lines are pulled up by pull up resistors 433a,b,...n, tied to positive logic supply line 450. Therefore, the closure of any of the switches 434a,b,...n each tied to ground will cause a logic zero to be applied to the respective OR gate, and during the preset, to the respective preset data inputs 435a,b,...n on the 12 bit counter. In this way it is now appreciated that the binary counter may be preset to any 12 bit binary number through the action of switches 434a,b,...n and in response to the closure of preset switch 419 all mounted on a front panel external to the printed circuit board circuitry.

It may now be further appreciated that should the binary counter reach its maximum count, the counter will be frozen at this maximum count until the preset switch is again closed. This occurs since, as mentioned above, a low signal on the carry out line 430 "sets" the flip flop circuitry causing a logic 0 on line 420 and a logic 1 on line 421. As described above this will cause the counter to be preset without the action of switch 419. In this case the preset data inputs 435a,b,...n will all be at logic 1 regardless of the positions of switches 434a,b,...n due to the fact that a logic 1 on line 421 will cause all OR gates 432 a,b,...n to produce a logic 1 at their outputs. This forces the counter to a 11...1 count until the preset switch is again closed. Since the count 11...1 causes this action to be taken in the first place, a count of 11...1 is seen to be locked automatically until a user overrides the situation via preset switch 419. It can now be understood that this prevents the battery current from cycling through all possible values when too little current is available. Specifically, since a higher binary count translates to a higher current from the battery as described earlier, and since a current in the battery which is too low will advance the counter, it is advantageous to stop the process when the counter is at maximum since further counting will cause the counter to 'roll over' to 00.0 and begin counting again in vain.

Figure 8:
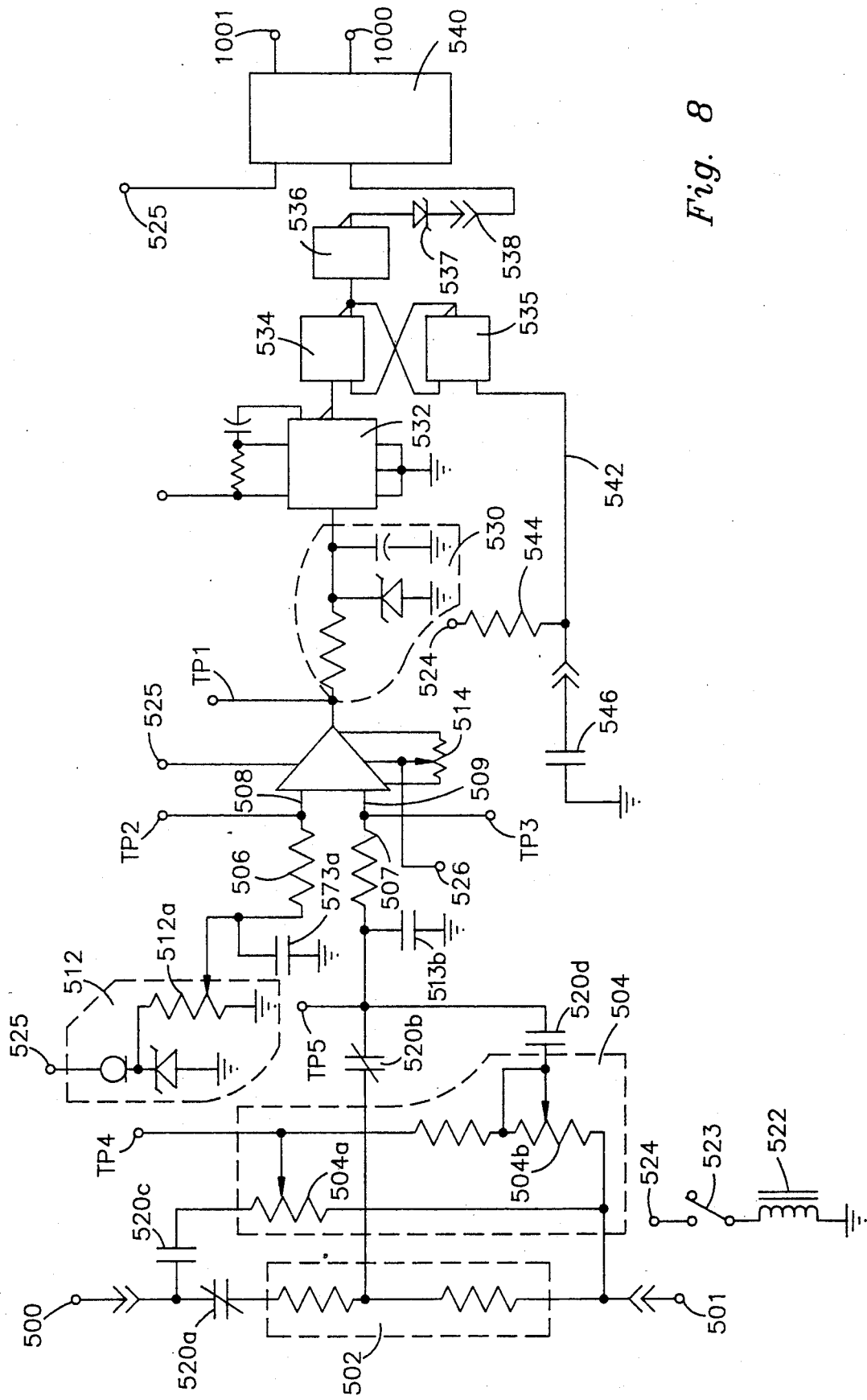
FIG. 8 is a schematic diagram showing the manner in which an undervoltage shutdown control may be constructed and operated in accordance with this invention.

FIG. 8 illustrated a typical circuit for in the event of an undervoltage on the battery. In normal operation battery voltage applied between terminals 500 and 501 is sensed by resistor divider 502 which applies a fixed fraction of the battery voltage to the inverting input 509 of comparator 510 through protection resistor 507, typically 1 Kohm. Signal flow in normal operation is enabled via normally closed contacts 520a and 520b of a relay with coil 522 energized for calibration purposes by the closure of switch 523 connected to the positive logic supply terminal 524. During calibration switch 520b, and closes normally open contacts 520c and 520d. This applies a signal from alternate voltage divider 504 to input 509 on comparator 510. The division ratio is adjusted coursely and finely via potentiometers 504a and 504b, respectively. A stable reference voltage is applied to the noninverting input 4  508 of comparator 510 through protection resistor 506 via the action of adjustable reference circuitry 512. The magnitude of the reference voltage may be matched to a set point, typically established using adjustable divider 504, via the adjustment of potentiometer 512a. Noise presented to the inputs of comparitor 510 may be minimized through the use of bypass capacitors 513a and 513b. Trimpot 514 may be used to trim the input offset voltage of comparator 510 in the usual way. A typical component to implement the comparator in this application is a 741 14 op amp. Test points TP1-TP5 are useful in the adjustment of the above mentioned components.

In the normal operation adjustments to the above mentioned components would be made to apply typically 1% of the battery voltage to input 509 and 1of the undervoltage trip voltage to input 508 of the comparator 510. In this way the comparator 510 will produce a voltage near the positive supply voltage is below the undervoltage trip point and a voltage near the supply voltage available from terminal 526 otherwise.

The output of comparator 510 is applied to the input of single-shot 532 with associated circuitry through clamp circuitry 530, which converts the high output of the comparator to a logic 1 level and the low output of the comparator to an acceptable logic 0 level. Accordingly, a high logic signal applied to IC 532 produces a low pulse at the output of the single-shot circuitry which 'sets' RS flip flop circuitry comprising NAND gates 534 and 535, in a similar manner as described for the circuitry of FIG. 7, thereby applying a logic 1 to the input of inventor 536 which then pulls line 538 low through zener diode 537, energizing solid state relay 540 connected typically to positive supply terminal 525. Relay 540 corresponds to relay 216 in FIG. 5 and, as described earlier, energizing this relay will cause the battery circuit to be broken and the undervoltage pilot lamp to be illuminated on the front panel.

It can now be understood that in normal operation if the battery voltage drops below the predetermined undervoltage trip point then comparator 510 will produce a high output voltage level ultimately breaking the battery circuit. The flip flop circuitry controlling the relay 540 can be reset with a low signal applied to line 542 connected to pull up resistor 544 tied to positive logic supply terminal 524. This is accomplished by the closure of normally open relay contacts 546 controlled by reset relay coil 211 on FIG. 5.

It will accordingly be appreciated that many variations may be resorted to in the actual practice of this invention, all without sacrificing the accuracy of current discharge, with the use of commercially available sub-assemblies wherever possible, and wherein advantage may be taken of the fact that the construction of the apparatus may be highly modular, thus simplifying repair and updating of designs. It will also be appreciated that the system in accordance with this invention provides a basic functionality which allows the same basic unit to be used for wide varieties of batteries and wide varieties of short or long battery strings.

It will further be appreciated that the apparatus in accordance with this invention may be entirely air cooled and may use only resistive dissipation, thus eliminating problems of blown transistors or the like.

It will further be appreciated that the apparatus in accordance with this invention may include a commercial digital panel meter and digital comparator, thus eliminating the common problem of drift. Of course, the system in accordance with this invention can be retrofitted to utilize the heater portion of existing systems.

Various modifications may be made and equivalents may be substituted, as heretofore discussed. Further, certain features of the invention may be utilized independently of other features, all without departing from the spirit and scope of the invention as defined in the appended claims.

I claim:

1. Apparatus for controlling rate of battery current discharge, comprising:
   a. variable means applying resistance load to said battery output;
   b. comparator means connected for defining and communicating a targeted battery discharge current level set point;
   c. sensor means connected for sensing the rate of current discharge from said battery, and connected to said comparator for comparing the actual battery discharge current rate to said targeted battery discharge current, and
   d. adjusting means connected to said variable means and operative responsively to said comparator means for incrementally increasing or decreasing said resistive load in response to signals from said comparator means as to whether said battery discharge current exceeds said targeted current set point;

wherein said means for incrementally increasing or decreasing resistive load connected to said battery further comprises:
   e. binary counter means for maintaining a count of current steps of predetermined levels by which said discharge current rate differs from said set point and continuously providing output signal corresponding to said counted steps;
   f. relay means, operative responsively to said output signal of said binary counter means, for actuating contactor means;
   g. said contactor means being arranged for connecting said battery to a selected resistive load; and
   h. a plurality of resistive loads adapted to be connected in varying combinations to said battery via said contactor means.

2. Apparatus of claim 1 wherein said resistive loads of said plurality are binary weighted.

3. A method for controlling current discharge rate from a lead-acid battery, comprising:
   a. loading a plurality of binary counters with data representative of an initial counter set point indicative of a desired rate of current discharge;
   b. connecting a preselected resistive load to said battery and thereby causing said battery to provide discharge current through said load;
   c. comparing the rate at which said current is discharged by said battery to said desired rate of current discharge and computing the difference if any, there between;

such difference being designated a positive difference if said actual rate at which current is discharged is greater than said desired discharge rate but being designated as a negative discharge rate if said actual rate is less than said desired discharge rate;
   d. computing said difference as a binary number or a binary difference;
   e. progressively engaging additional resistive loads in binary-weighted incremental amounts corresponding to said binary difference until the battery discharge current through the resistive load is less than the desired rate of current discharge; and
   f. cyclically repeating steps c through e as said binary discharges until the discharge current rate reaches the preselected desired level.

4. A method for controlling current discharge rate from a lead-acid battery, comprising:
   e. loading a latch with data representative of an initial set point indicative of a desired rate of discharge current;
   b. connecting a preselected resistive load to said battery thereby causing said battery to discharge current through said load;
   c. connecting an amplifier in parallel with said preselected resistive load to amplify voltage across said resistive load;
   d. providing output of said amplifier to an analog to digital convertor to count output voltage of said amplifier to a digital representation of preselected output voltage of battery discharge current passing through said digital resistive load;
   e. comparing said representation of rate of battery discharge current to said desired rate of current discharge and providing an appropriate output signal indicative of equality or inequality of present and desired battery discharge currents;
   f. progressively incrementing counters engaging additional resistive loads in binary-weighted incremental amounts until battery discharge current through said preselected resistive load equals said desired discharge current;
   g. cyclically repeating steps c through f to monitor battery discharge current until battery discharge current is equal to desired discharge current.

5. A method for controlling lead-acid battery discharge current using digital integrated logic circuitry to engage and control a variable array of binary-weighted resistive loads through which said battery discharge current passes, comprising:
   a. comparing a digital representation of a sensed battery discharge current to a digital representation of a desired rate of battery discharge current stored in a latch, and sending an output signal indicating the equality or inequality of said sensed battery discharge current and said desired battery discharge current to a plurality of counters;
   b. maintaining or incrementing count of said counters;
   c. sending output signals of a plurality of binary counters to inputs of respective inverting line driving gates thereby driving each said output signal through a respective zener diode;
   d. sending each output of each zener diode to the inputs of respective solid state relays thereby energizing only those relays receiving the proper input signal;
   e. energizing solid state relay switches receiving said proper input to change low current from said digital logic circuit to high circuit; and
   f. sending high current from energized solid state relay switching to respective mercury switches and thereby closing respective mercury switches and decreasing resistive load.

* * * * *